US012596235B2

(12) United States Patent
LeBlanc et al.

(10) Patent No.: US 12,596,235 B2
(45) Date of Patent: Apr. 7, 2026

(54) DOWNHOLE FIBER OPTIC CABLE DESIGNED WITH IMPROVED STRAIN RESPONSE AND DESIGNED FOR LONG LIFE IN THE WELL

(71) Applicant: Halliburton Energy Services, Inc., Houston, TX (US)

(72) Inventors: Michel LeBlanc, Houston, TX (US); John Laureto Maida, Houston, TX (US); Mikko Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 343 days.

(21) Appl. No.: 18/313,484

(22) Filed: May 8, 2023

(65) Prior Publication Data

US 2024/0377599 A1 Nov. 14, 2024

(51) Int. Cl.
*G02B 6/44* (2006.01)
*E21B 47/00* (2012.01)

(52) U.S. Cl.
CPC ............ *G02B 6/4435* (2013.01); *E21B 47/00* (2013.01)

(58) Field of Classification Search
CPC .............................. G02B 6/4435; E21B 47/00
See application file for complete search history.

(56) References Cited

U.S. PATENT DOCUMENTS

| | | | |
|---|---|---|---|
| 4,477,147 A * | 10/1984 | Winter | G02B 6/4488 228/151 |
| 6,960,724 B2 | 11/2005 | Orlet et al. | |
| 8,111,952 B2 | 2/2012 | Herbst | |
| 8,640,740 B2 | 2/2014 | Herbst | |
| 9,335,502 B1 | 5/2016 | Wysocki et al. | |
| 9,557,231 B2 | 1/2017 | Villiger et al. | |
| 9,733,444 B2 | 8/2017 | LeBlanc | |
| 2010/0303429 A1* | 12/2010 | Gibson | C03B 37/02781 65/393 |
| 2023/0417114 A1* | 12/2023 | Jaaskelainen | E21B 23/01 |

* cited by examiner

*Primary Examiner* — Kristina M Deherrera
*Assistant Examiner* — Jean F Morello
(74) *Attorney, Agent, or Firm* — DeLizio, Peacock, Lewin and Guerra, LLP

(57) ABSTRACT

An optical fiber cable for use in a wellbore proximate to a subsurface formation, the optical fiber cable comprising one or more optical fibers configured in a state of axial compression at room temperature, wherein the one or more optical fibers are configured to remain in the state of axial compression during a thermal expansion of the optical fiber cable in the wellbore. The optical fiber cable includes one or more coatings disposed around the one or more optical fibers, wherein the one or more coatings are configured to coat the one or more optical fibers, and the optical fiber cable further includes a metallic armor disposed around the one or more optical fibers and the one or more coatings.

20 Claims, 13 Drawing Sheets

200

201

203

205

207

400

401

403

GEOMETRIES:

| DIMENSION | SPECIFICATION |
|---|---|
| CLAD DIAM. | 125 ± 1 um |
| COATING DIAM. | 450 ± 30 um |
| BUFFER DIAM. | 700 ± 50 um |
| CORE/CLAD CONC. ERROR | ≤ 0.75 um |
| CLAD NON CIRCULARITY | ≤ 2.0% |
| COATING CONC. | ≥ 80% |
| BUFFER CONCENTRICITY | ≥ 80% |
| LENGTH | 1 km MIN |

500

μ∈

501

Fiber Insert

507

Metal Outer

505

T (degC)

503

DOWNHOLE FIBER OPTIC CABLE DESIGNED WITH IMPROVED STRAIN RESPONSE AND DESIGNED FOR LONG LIFE IN THE WELL

TECHNICAL FIELD

The disclosure generally relates to wellbores formed in subsurface formations, and in particular, downhole cables used proximate to one or more subsurface formations.

BACKGROUND

Traditionally, some downhole cables may comprise an optical fiber surrounded by a gel in a metal tube (fiber in metal tube, i.e., FIMT). This design allows extra fiber length to be placed in the cable such that thermal expansion of the metal tube does not place the optical fiber in tension. A sustained large tension in the fiber may weaken the fiber and ultimately result in fiber failure. This is because tension in the fiber may cause micro-cracks to grow on a glass surface of the fiber. In a gel-filled cable construction, the optical fiber is largely insensitive to changes in axial strain along the cable. This is not an issue when measuring a temperature profile of a well or monitoring small strain changes within the cable (e.g., where the friction between the fiber and the metal tube or where the viscosity of the gel surrounding the fiber are sufficient to transfer the strain changes of interest). However, this configuration may not be well-equipped for detecting larger changes of cable length or for using the fiber optic cable for true strain sensing. This may be important in unconventional wells, as better strain coupling may be needed to reliably compare measurement and geomechanical models of cross-well strain. If one is interested in measuring how the rock deforms using a fiber optic cable, then excellent strain coupling may be needed at all interfaces between the rock formation and the silica-based fiber core.

BRIEF DESCRIPTION OF THE DRAWINGS

Implementations of the disclosure may be better understood by referencing the accompanying drawings.

DESCRIPTION OF SOME EXAMPLE IMPLEMENTATIONS

The description that follows includes example systems, methods, techniques, and processing flows that embody implementations of the disclosure. However, it is understood that this disclosure may be practiced without these specific details. In other instances, well-known instruction instances, protocols, structures, and techniques have not been shown in detail in order not to obfuscate the description.

Overview

Traditionally, some cables have been produced for targeting improved stain coupling for downhole applications. However, in such designs, an optical fiber in the cable may be placed in tension by thermal expansion of the cable. This may contribute to a lifespan of the cable lasting less than 3 years. Thus, there may be a desire to have a cable that outlasts the life of the well (>20 years).

An improved downhole fiber optic cable may be designed for strain coupling while avoiding thermal-induced tension on the glass fiber. The cable may be designed to avoid fiber breakage over time by allowing thermal expansion of the cable itself or the structure to which the cable is attached (e.g., casing or production tubing). To accomplish this, the cable may consist of a fiber insert, where the fiber is surrounded with solid material such as a metal layer. The metal layer may be processed to cover and compressively fit against the fiber insert to provide acceptable strain and pressure coupling to the optical fiber. Components of the cable may be selected and processed such that, at an ambient surface temperature (such as a temperature between 18 and 35 degrees Celsius), the optical fiber is under a state of considerable axial compression. Design aspects may be chosen such that the optical fiber may remain in a state of axial compression during thermal expansion of the cable over the full temperature range expected in the downhole environment. Micro-cracks on the optical fiber surface are not expected to grow when the optical fiber is in a state of axial compression, thereby preserving the strength of the optical fiber and avoiding a premature failure of the optical fiber cable by breakage of the optical fiber.

Example Cable

Figure 1:
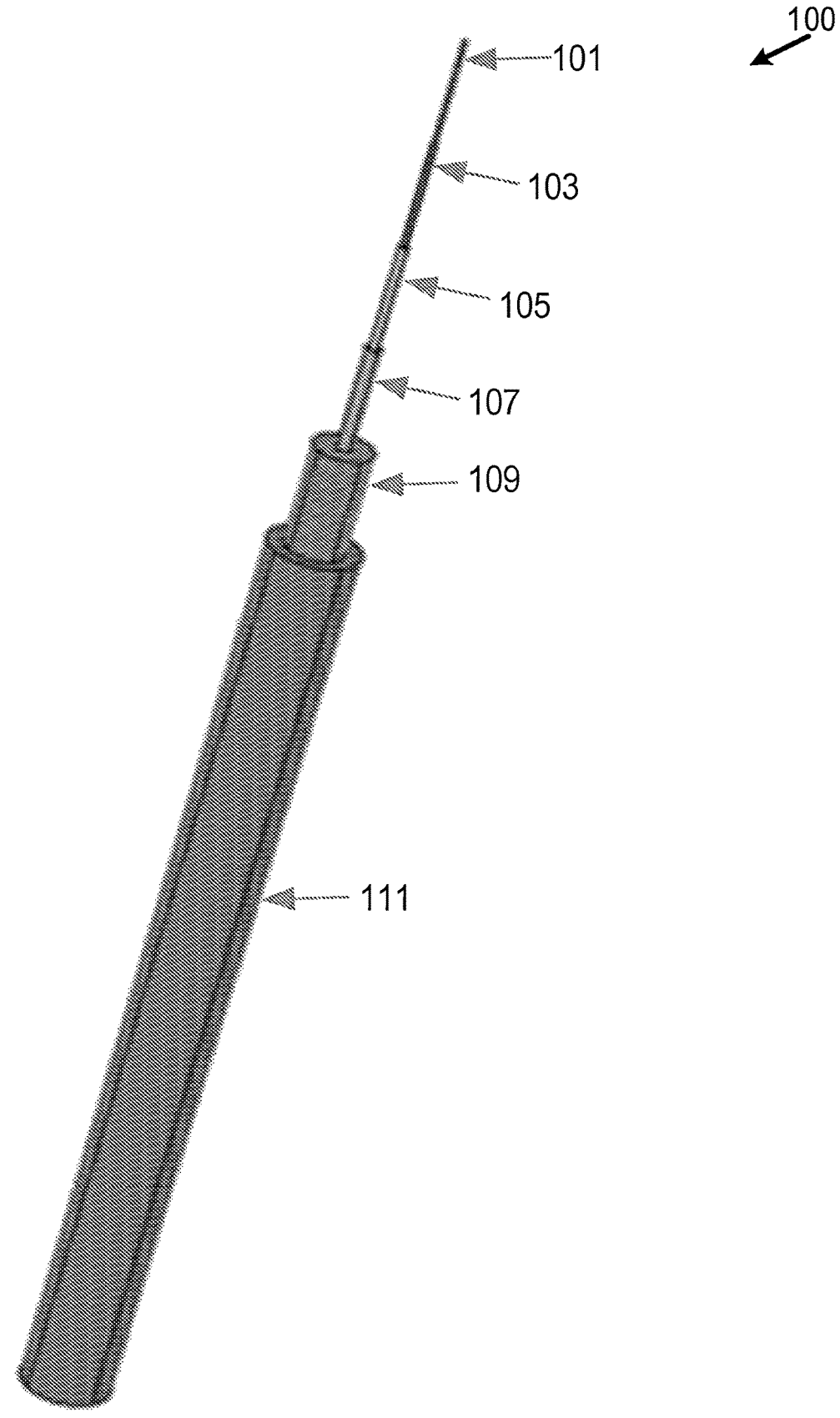
FIG. 1 is a first schematic diagram depicting an example tight cable configuration of a fiber optic cable, according to some implementations.

FIG. 1 is a first schematic diagram depicting an example tight cable configuration of a fiber optic cable, according to some implementations. An optical fiber cable 100 may comprise an optical fiber 101. In some implementations the optical fiber 101 may be comprised of silica (glass), although other configurations of silica and various other materials may be used. In some implementations, the optical fiber cable 100 may comprise multiple optical fibers. The optical fiber 101 may be coated with a high-temperature-rated acrylate coating 103 for use in high-temperature applications, such as in a wellbore. The acrylate coating 103 may be surrounded by a silicone coating 105 for added insulation and protection and, most significantly, to shield the optical fiber 101 from micro-bending, which would create attenuation of the of optical signal propagating in the optical fiber 101. In some implementations, the silicone coating 105 may be replaced by a high-temperature-rated polymeric coating, although other materials and configurations may be possible. The silicone coating 105 may increase a diameter of a broader optical fiber insert comprising the optical fiber 101 and various coatings to an outer diameter greater than 260 micrometers (μm), although in some implementations the outer diameter may increase to 0.6 mm or greater. In other implementations, the silicone coating 105 may be applied directly to the optical fiber 101 and the acrylate coating 103 may surround the silicone coating 105. Surround may refer to an outer component being disposed around a majority of an inner component. The silicone coating 105 may be further concentrically surrounded by an inner PEEK layer 107 and an outer PEEK layer 109. The PEEK layers 107, 109 may be selected based on their material properties, such as their melting temperatures and coefficients of thermal expansion (CTEs). For example, inner PEEK layer 107 may have a higher melting temperature compared to outer PEEK layer 109, to allow for layer 109 to be extruded over layer 107. While PEEK may be a preferred material, other materials comprising desirable properties may be used in place of the PEEK layers 107, 109. For example, a layer of polyetherimide (PEI) such as, but not limited to, ULTEM™ (a trademark of SABIC) may be utilized in place of one or more of the PEEK layers 107, 109. In other implementations, any material of a family of materials comprising high strength, all-dielectric, high temperature use polymeric coatings may be utilized in place of the one or more PEEK layers 107, 109. For example, the PEEK layers 107, 109 may instead be comprised of Organic Modified Ceramics (Ormocers), other PEIs, a combination thereof, etc. A composite material, such as a continuous graphite fibers in a matrix of polyphenylene sulfide (PPS, a thermoplastic), etc. may also be used to encapsulate the optical fiber 101 to form the insert.

The optical fiber 101, acrylate coating 103, silicone coating 105, inner PEEK layer 107, and outer PEEK layer 109 may collectively be referred to as a fiber insert. The fiber insert may be enveloped by a metallic armor 111. In some implementations, the metallic armor 111 may be comprised of a metal or an alloy such as stainless steel, although other materials and configurations may be possible. The metallic armor 111 may comprise one or more layers, where additional layers may be comprised of a similar or dissimilar metal to the innermost layer of the metallic armor 111. In some implementations, the one or more layers of the metallic armor 111 may comprise identical or varying thicknesses. In other implementations, the metallic armor 111 may be comprised of aluminum to mitigate hydrogen migration into the optical fiber cable 100. Cables of higher complexity may also be utilized for the optical fiber cable 100. For example, in some implementations the optical fiber cable 100 may be comprised of a flatpack cable with bumper wires encapsulated in polypropylene, vulcanized polymer alloys comprising cured ethylene propylene diene monomer (EPDM) such as Santoprene, or a similar material.

The optical fiber 101 may be configured in a state of axial compression at room temperature of a greater magnitude than standard. A state of axial compression for the optical fiber 101 may be characterized by an axial stress in the optical fiber ($\sigma_{z,f}$) as negative. It may be desirable to present this state of axial compression in the optical fiber 101 even when the optical fiber cable 100 is in the hot downhole environment. If $T_{max}$ represents the maximum temperature of fiber cable 100 for which we want the optical fiber 101 to remain in compression, we may design the optical fiber cable 100 such that the relation of Equation 1 below holds true:

$$\sigma_{z,f} < E_f(\alpha - \alpha_f) * (T_{ref} - T_{max}) \qquad \text{Eq. (1)}$$

where $E_f$ is the Young's modulus of silica (70.3 gigapascals (GPa)), $\alpha_f$ is the linear coefficient of thermal expansion (CTE) of silica (0.5 με/K, where K represents the unit of temperature Kelvin and με is a microstrain), and $\alpha$ is the larger of either $\alpha_{eff}$, the effective CTE of the optical fiber cable 100, and $\alpha_{structure}$, the CTE of a structure to which the optical fiber cable 100 is attached to. The temperature $T_{ref}$ is a temperature representative of the ambient temperature at the surface, as opposed to the downhole temperature which will be higher. (e.g., $T_{ref}$ may be equal to 25° C.). As discussed above, in Eq. 1, a negative value for $\sigma_{z,f}$ indicates that the optical fiber is in a state of axial compression.

Tensional forces may be induced in the optical fiber 101 either by thermal expansion of the optical fiber cable 100 or the cable structure to which the fiber is attached. In some implementations, $T_{max}$ may be a temperature of at least 80° C. Thus, when no tensional force is applied to the optical fiber cable 100 up to $T_{max}$, the optical fiber 101 may exist in the state of axial compression. The optical fiber 101 may gradually become in an increasing state of tension ($\sigma_{z,f}$ positive) for temperatures above $T_{max}$.

In some implementations, a compressive fiber elastic strain may be related to a compressive stress by the relation below, where the fiber axial elastic strain ($\varepsilon z,f$) is equal to a quotient of the axial stress and the Young's modulus of silica. Equation 2 is shown below:

$$\varepsilon_{z,f} = \frac{\sigma_{z,f}}{E_f} \qquad \text{Eq. (2)}$$

In some implementations, the optical fiber cable 100 may be configured with a higher CTE than the structure to which it is attached. As described above, the structure may typically comprise a well casing or production tubing, and its CTE may be that of regular carbon steel (~12.2 με/K), which is relatively low compare to the CTE of metals typically used for fiber cable armor (such as stainless steel 316L, with a CTE of 16 με/K). For this reason, a metallic armor 111 comprising a material of a lower CTE may be used. For example, an Inconel Alloy 625 may comprise a CTE of 12.8 με/K. If aluminum (CTE of 25 με/K) is used for the metallic armor 111, the metallic armor 111 may be surrounded by or covered with a lower CTE layer to contain the aluminum's thermal expansion. In addition, an unconstrained radial expansion of a metallic armor 111 comprised of aluminum may result in poorer strain coupling through creation of a micro-annulus between the aluminum armor and the layers within. The outer layer with the lower CTE may prevent the formation of the micro-annulus.

Figure 2:
FIG. 2 is a cross-sectional view of the example fiber optic cable, according to some implementations.
Figure 2:
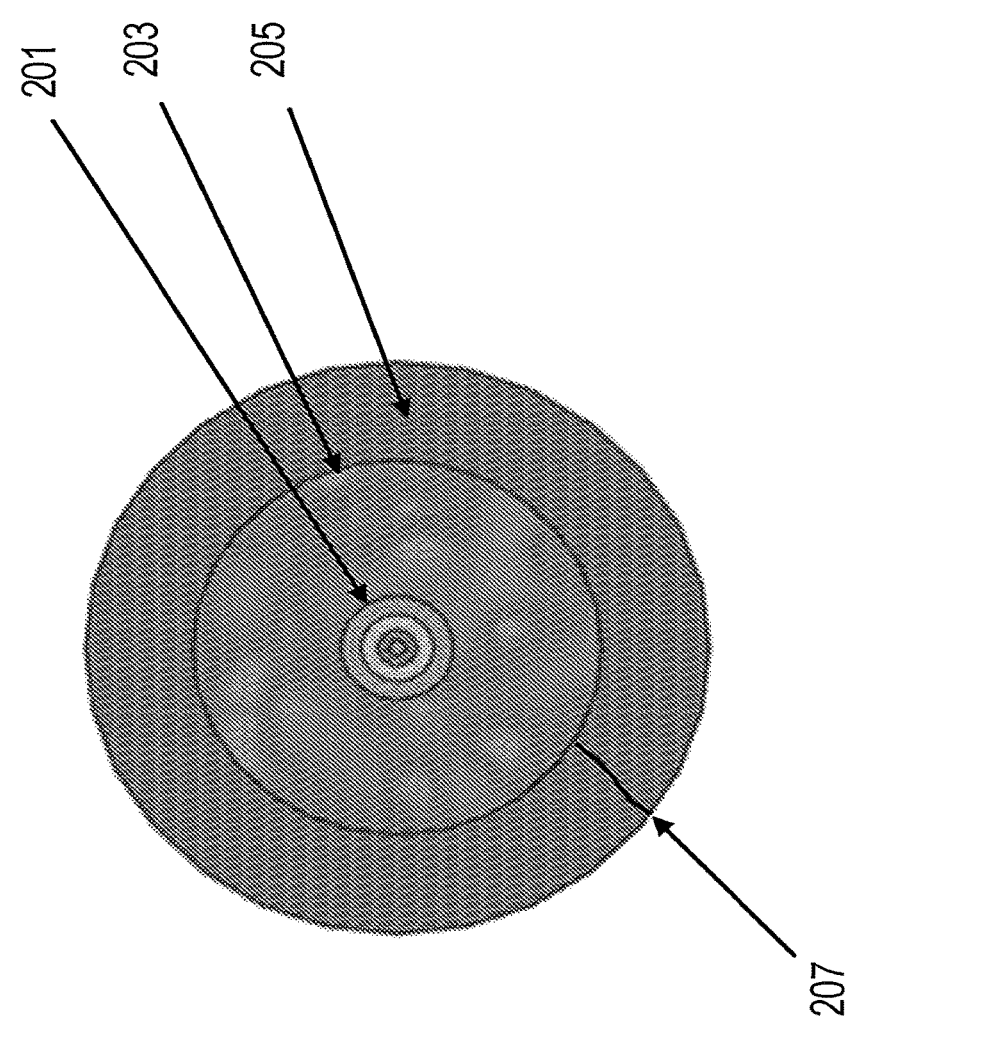

FIG. 2 is a cross-sectional view of the example fiber optic cable, according to some implementations. A cross-section 200 may be described with reference to FIG. 1. The cross-section 200 depicts an example fiber optic cable similar to the optical fiber cable 100. The cross-section 200 includes an inner PEEK layer 201 which may be similar to the inner PEEK layer 107. Similarly, an outer PEEK layer 203 may be similar to the outer PEEK layer 109 of FIG. 1. A metallic armor 205 may be similar to the metallic armor 111 of FIG. 1. A weld 207 may seal the metallic armor 205 around the inner PEEK layer 201 and outer PEEK layer 203. In some implementations, the weld 207 may be accomplished via laser welding, although other welding methods may be used. The weld 207 may be achieved before the metallic armor layer 205 is reduced in diameter by pulling the cable through diameter-reducing dies. In some implementations, the metallic armor 205 may comprise a thickness of at least 0.1 mm, although other implementations may include a metallic armor equal to or exceeding 0.2 mm. The metallic armor 205 may be locked around a fiber insert comprising at least the inner PEEK layer 201, outer PEEK layer 203, one or more coatings, and one or more optical fibers. The metallic armor 205 may contact the outer PEEK layer 203 and may be fit around the fiber insert via a compression fit, achieved by reducing the diameter of the metallic armor 205 as described above.

Figure 3:
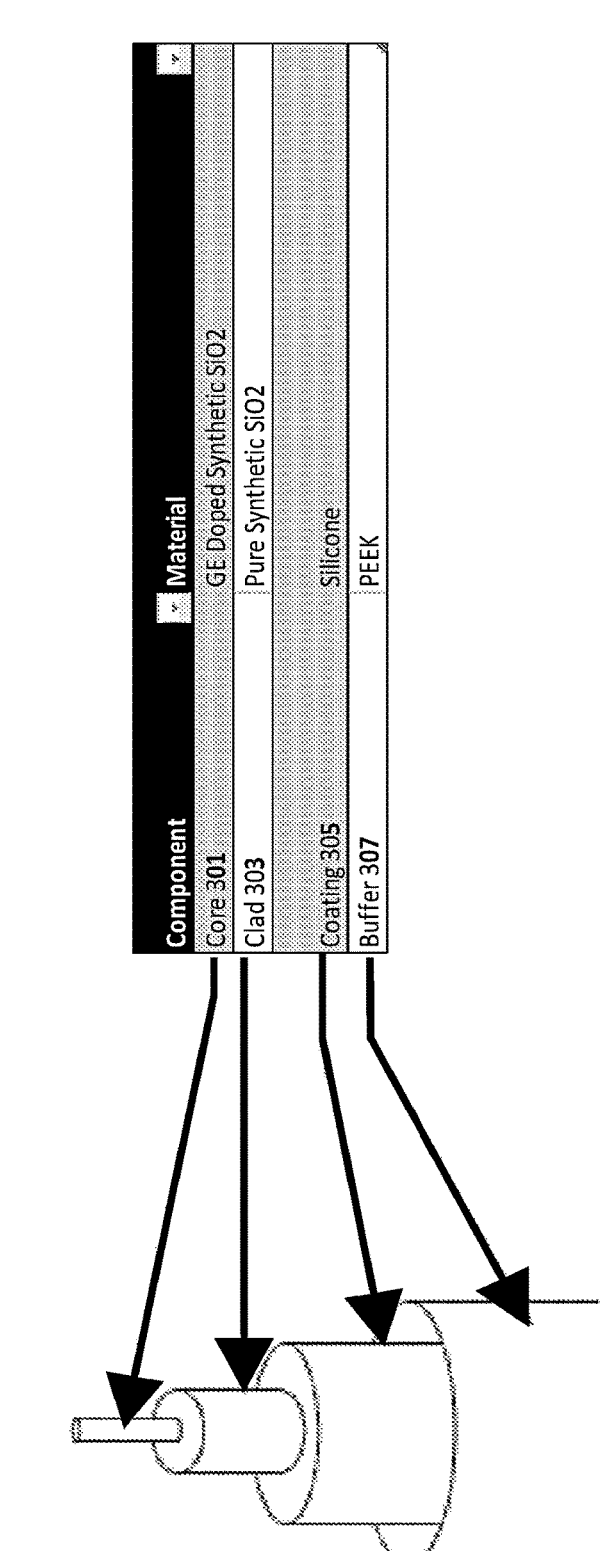
FIG. 3 is a second schematic diagram depicting components of a PEEK-coated optical fiber, according to some implementations.

FIG. 3 is a second schematic diagram depicting components of a PEEK-coated optical fiber, according to some implementations. A cable diagram 300 may be described with reference to FIG. 1. The cable diagram 300 includes a core 301, a clad 303, a coating 305, and a buffer 307. The core 301, which may be similar to the optical fiber 101 may be comprised of a Germanium (Ge) doped synthetic silica (silicon dioxide, $SiO_2$) optical fiber. The core 301 may be surrounded by a clad or cladding 303. In some implementations, the cladding 303 may be a glass composed of pure synthetic silica, $SiO_2$. The cladding 303 may comprise one or more layers of lower refractive index materials, whereas the core 301 is comprised of a material of a higher refractive index. The cladding 303 may reduce attenuations of light caused by surface imperfections of the core 301. The cladding 303 may be surrounded by a coating 305. In some implementations, the coating 305 may be comprised of silicone, similar to the silicone coating 105 of FIG. 1. Lastly, the coating 305 may be surrounded by a buffer 307. In some implementations, the buffer 307 may be comprised of PEEK. One or more layers of the buffer 307 may be used. While the above-described materials may be used for the core 301, clad 303, coating 305, and buffer 307, other materials and configurations may be utilized. For example, acrylate may be used instead of silicone for coating 305 and ULTEM™ PEI or an Ormocer may be used instead of PEEK for buffer 307.

Figure 4:
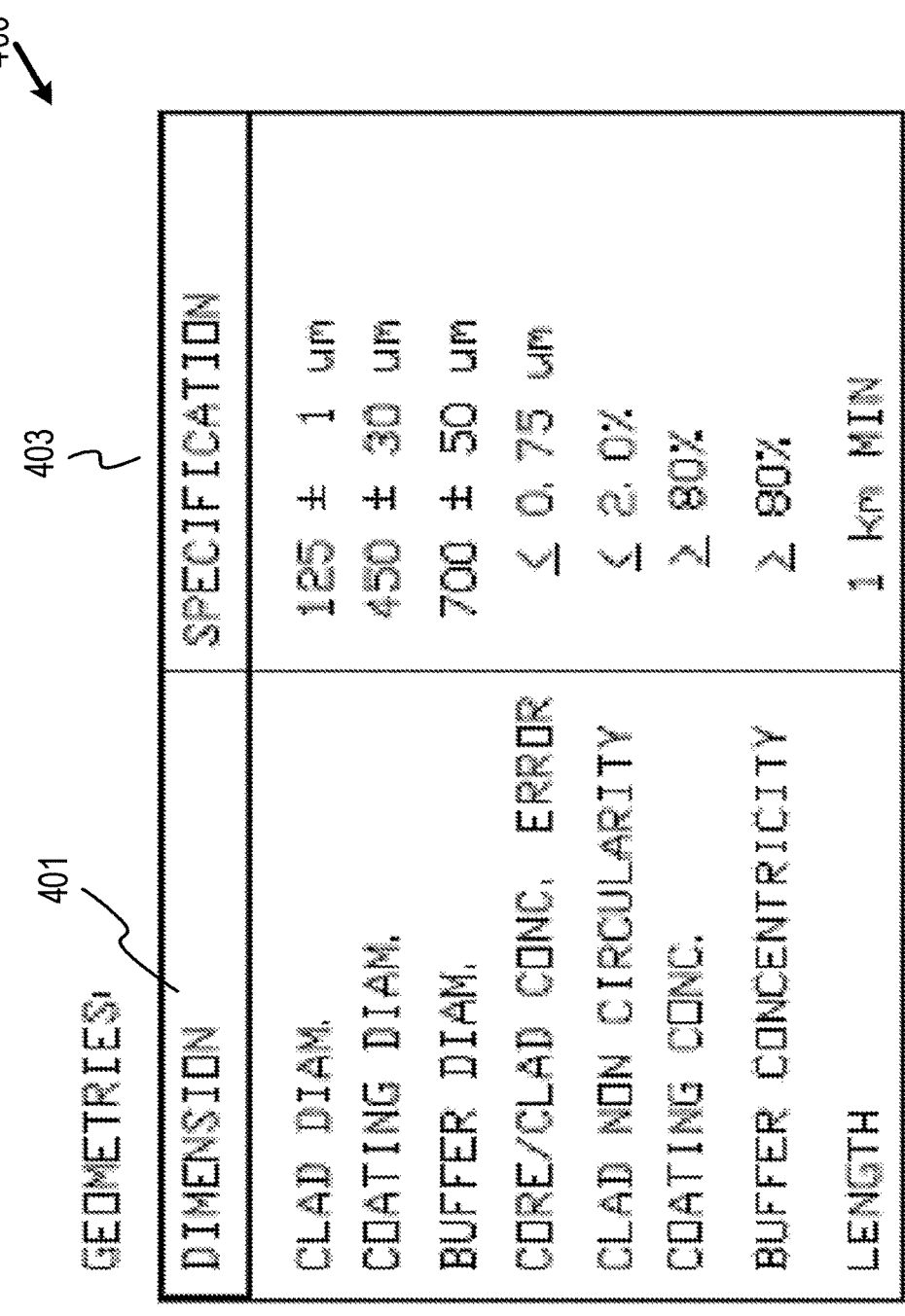
FIG. 4 is a table depicting dimensions of an example fiber optic cable, according to some implementations.

FIG. 4 is a table depicting dimensions of an example fiber optic cable, according to some implementations. A table 400 may be described with reference to FIGS. 1 and 3. The table 400 depicts a plurality of dimensions 401 (components) of an example optical fiber cable and corresponding specifications 403. For example, with reference to FIG. 3, the cladding 303 of FIG. 3 may comprise a cladding diameter (clad diam.) of 125±1 microns (micrometers, μm). The coating 305 may comprise a coating diameter (coating diam.) of 450±30 microns. The buffer 307, which may comprise an inner PEEK layer and an outer PEEK layer, may be specified to a diameter of 700±50 μm. A concentricity error of the core 301 and cladding 303 may be less than or equal to 0.75 microns (≤0.75 μm). The concentricity error may refer to a distance between a center of two concentric circles that specify the cladding diameter and the center of the two concentric circles that specifies the core diameter. A non-circularity of the cladding may be less than or equal to 2%. A concentricity of the coating 305 and a concentricity of the buffer 307 may both be ≥80%. The concentricity of the coating or buffer, expressed as a percentage, may be obtained as the ratio of the minimum thickness of the coating to the average thickness of the coating or buffer. An optical fiber cable similar to the optical fiber cable 100 of FIG. 1 may comprise a minimum length of 1 kilometer, as shown in FIG. 4. The dimensions 401 and specifications 403 depicted in FIG. 4 may be selected to satisfy Equation 1. While the above dimensions 401 and specifications 403 may be used in an example cable similar to those depicted in FIGS. 1 and 3, other measurements, configurations, and thresholds may be utilized.

Figure 5A:
FIG. 5A is a first plot depicting thermal expansion strain of a fiber insert and metal layer when separated, according to some implementations.

FIG. 5A is a first plot depicting thermal expansion strain of a fiber insert and metal layer when separated, according to some implementations. The figure illustrates the thermal expansion of the fiber insert and the metallic armor if the two are not interacting with each other. A plot 500 may be described with reference to FIG. 1. The plot 500 depicts an X-axis 503 measuring temperature in Celsius and a Y-axis 501 measuring values of microstrain (με). Strain values of a fiber insert comprising an optical fiber may be represented by a fiber insert curve 507. In some implementations, the fiber insert may be similar to a fiber insert comprising the optical fiber 101, acrylate coating 103, silicone coating 105, inner PEEK layer 107, and outer PEEK layer 109 of FIG. 1, although other materials may be used for the PEEK layers 107, 109. Strain values of a metal layer surrounding the fiber insert may be represented by a metal outer curve 505. In some implementations, the metal layer may be similar to the metallic armor 111 of FIG. 1. In FIG. 5A, the metal layer has not yet been applied to the fiber insert. Thus, the curves 507 and 509 depict free thermal expansions of the fiber insert and metal layer, respectively, over a temperature range when the two components are separated. In particular, curve 507 depicts the expansion of the fiber insert, including all the layers up to the outer coating layer (i.e., PEEK layer 109). The optical fiber 101 and the coating layers (103, 105) applied directly to the optical fiber may together be characterized by the elastic strain $\varepsilon_{z,f}$ per Eq. 2. During the expansion of the fiber insert, changes in $\varepsilon_{z,f}$ will follow that of the broader fiber insert but may also include a residual strain component. The residual strain component may be included as an offset set which may be considered to be the elastic strain in the optical fiber at $T=T_{ref}$. In other plots such as those depicted in FIG. 5B (described below), the elastic strain $\varepsilon_{z,f}$ may be displayed directly on the plot. The elastic strain, $\varepsilon_{z,f}$, may be positive when the optical fiber in axial tension and negative when the optical fiber is in compression.

The effective CTE of a cable (α), fiber insert ($α_{insert}$), or any multi-layer fiber optic assembly may be estimated by the generaic formula in Equation 3:

$$\alpha_{eff} = \sum_{i=1}^{N} \frac{E_i A_i \alpha_i}{E_i A_i} \qquad \text{Eq. (3)}$$

where index i indicates the layer number, starting at one for the innermost layer, up to N, the index outer most layer, and where $E_i$, $A_i$ and $\alpha_i$ are, respectively, the Young's modulus, cross-sectional area, and CTE of layer i.

Figure 5B:
FIG. 5B is a second plot depicting an undesirable cable configuration in which the optical fiber is placed in tension, according to some implementations.
Figure 5B:

FIG. 5B is a second plot depicting an undesirable cable configuration in which the optical fiber is placed in tension, according to some implementations. A plot 510 may be described with reference to FIGS. 1 and 5A. The plot 510 depicts an X-axis 513 measuring temperature in Celsius and a Y-axis 511 measuring values of microstrain (με). A fiber strain in a free insert curve 517 represents the optical fiber elastic strain $\varepsilon_{z,f}$ before the mechanical union between the fiber insert and armor is achieved and therefore has a similar slope to that of the fiber insert described in FIG. 5A. Thus, "free" may refer to the fiber insert as not locked with an exterior metal layer while "locked" may refer to the fiber insert after union with a metal outer layer. The fiber strain in free insert curve 517 take into account residual compressive strain in the optical fiber. For example, at room temperature (such as $T_{ref}$=25° C. or a similar temperature), the optical fiber represented by the fiber strain in free insert curve 517 may comprise a residual compressive strain of –2,000 με. A metal outer curve 515 represents a thermal expansion of a metal layer similar to the metal layer described in FIG. 5A. When the fiber insert is not yet locked into a metal layer and heated past 90° C., the optical fiber becomes subject to tensional forces (i.e., its microstrain is a positive Y-axis value). A fiber strain in locked insert curve 519 represents strain values during thermal contraction upon cooling once the fiber insert has been locked within a metal layer (i.e., FIMT). The slope of the fiber strain in locked insert curve 519 mimics the slope of the metal outer curve 515 because the larger modulus of the metal layer may dominate a strain response of the locked fiber insert. In other words, any changes in strain may follow a thermal expansion or contraction response of the cable as a whole (comprising the fiber insert and metal layer), but the metal armor will dominate much of the cable's response.

In FIG. 5B, the lock of the metal layer and the fiber insert occurs at 300° C. This is not correct for intended outcomes and is depicted to show how incorrect operations may result in an optical fiber placed in tension rather than compression. Because the CTE of the fiber insert is larger than that of the metal layer surrounding it, a tension built up in the fiber during a heating process from 25° C. to 300° C. may remain in the optical fiber when the metal layer is joined with the fiber insert at 300° C. Once the locked fiber insert cools back down to room temperature, the tension may remain in the fiber, as shown by the curve 519. Thus, there is no tension-free temperature range in which the locked fiber insert may operate. This occurs because the CTE of the built cable (comprising the fiber insert locked within the metal layer) is lower than that of the fiber insert itself, so a contraction experienced during a temperature decrease may be smaller than a thermal expansion experienced during a temperature increase. Thus, the final stress on the optical fiber at room temperature is tensile, which is not ideal.

Figure 5C:
FIG. 5C is a third plot depicting the mechanical locking of the fiber insert and metal layer at room temperature, according to some implementations.

FIG. 5C is a third plot depicting the mechanical locking of the fiber insert and metal layer at room temperature, according to some implementations. A plot 520 may be described with reference to FIG. 1 and FIG. 5B. The plot 520 depicts an X-axis 523 measuring temperature in Celsius and a Y-axis 521 measuring values of microstrain (με). A fiber strain in free insert curve 527 may measure the strain in the optical fiber contained in the insert and track its change due to the thermal expansion of the insert. A metal outer curve 525 measures a thermal expansion of a metal layer. The fiber insert and metal layer may be similar to the fiber insert comprising the optical fiber 101 and the metallic armor 111 described in FIG. 1, respectively. In contrast to FIG. 5B, rather than locking the metal layer to the fiber insert at 300° C., the lock is achieved at room temperature. A thermal expansion of the locked cable, as depicted by a fiber strain in locked insert curve 529, may now comprise a tension-free temperature range 522. By locking the fiber insert and metal layer at room temperature rather than at 300° C., the optical fiber is able to retain a state of compression over a larger range of temperatures. This is because a lower CTE of the metal layer may keep the fiber in compression and resist expansion over an expected range of temperatures—i.e., the metal layer may expand slower than the optical fiber wants to expand, thus compressing the optical fiber within the cable. This operation of locking the metal layer to the fiber insert as described in FIG. 5C should satisfy Equation 1 (for $T_{max}$=150° C., as seen where curve 529 intersects the 0 με line).

From the two previous examples in FIGS. 5A-B, it should be evident that if the CTE of the insert is higher than that of the finished cable, it may be best to obtain a lock between insert and outer armor at as low a temperature as possible. The converse will also apply: when the CTE of the insert is smaller than that of the finished cable, it may be best to lock the insert and armor together at a high temperature so that the relatively large expansion of the armor may force the optical fiber that is in the insert to a higher state of compression when the temperature is reduced.

Figure 5D:
FIG. 5D is a fourth plot depicting a lock of the fiber insert and metal layer, according to some implementations.

Other processes and alterations may be utilized to satisfy Equation 1 and keep an optical fiber of the fiber insert in a state of compression. FIG. 5D is a fourth plot depicting a lock of the fiber insert and metal layer, according to some implementations. A plot 530 may be described with reference to FIG. 1 and FIG. 5B. The plot 530 depicts an X-axis 533 measuring temperature in Celsius and a Y-axis 531 measuring values of microstrain (με). A fiber strain in free insert curve 537 may measure the strain in the optical fiber contained in the insert and follow its change with temperature to due to the thermal expansion of the insert. A metal outer curve 535 measures a thermal expansion of a metal layer. The fiber insert and metal layer may be similar to the fiber insert comprising the optical fiber 101 and the metallic armor 111 described in FIG. 1, respectively. In FIG. 5D, the metal layer is brought to a temperature of 300° C. and locked with the fiber insert. However, in contrast to FIG. 5B, the metal layer is hotter than the fiber insert during the lock (T_max_insert is approximately 150° C.). During cooldown, the mechanical response of the assembled cable comprising the insert and metal layer may be dominated by the metal layer which should bring the optical fiber in the insert into a state of compression during the cooldown, as depicted by a fiber strain in locked insert curve 539. Thus, at room temperature, the optical fiber within the assembled cable may retain the state of axial compression. In this configuration the CTE of the cable itself governs the slope of the fiber strain in locked insert curve 539 (strain slope) rather than the fiber insert. The resulting cable assembly may comprise a tension-free temperature range 532 from room temperature to approximately 175° C. (For simplicity, the locked fiber insert fiber strain curve 539 is depicted assuming that the lock between metal armor and fiber insert takes place instantaneously while the metal armor is still at 300° C. and the fiber insert is still at 150° C.)

Figure 5E:
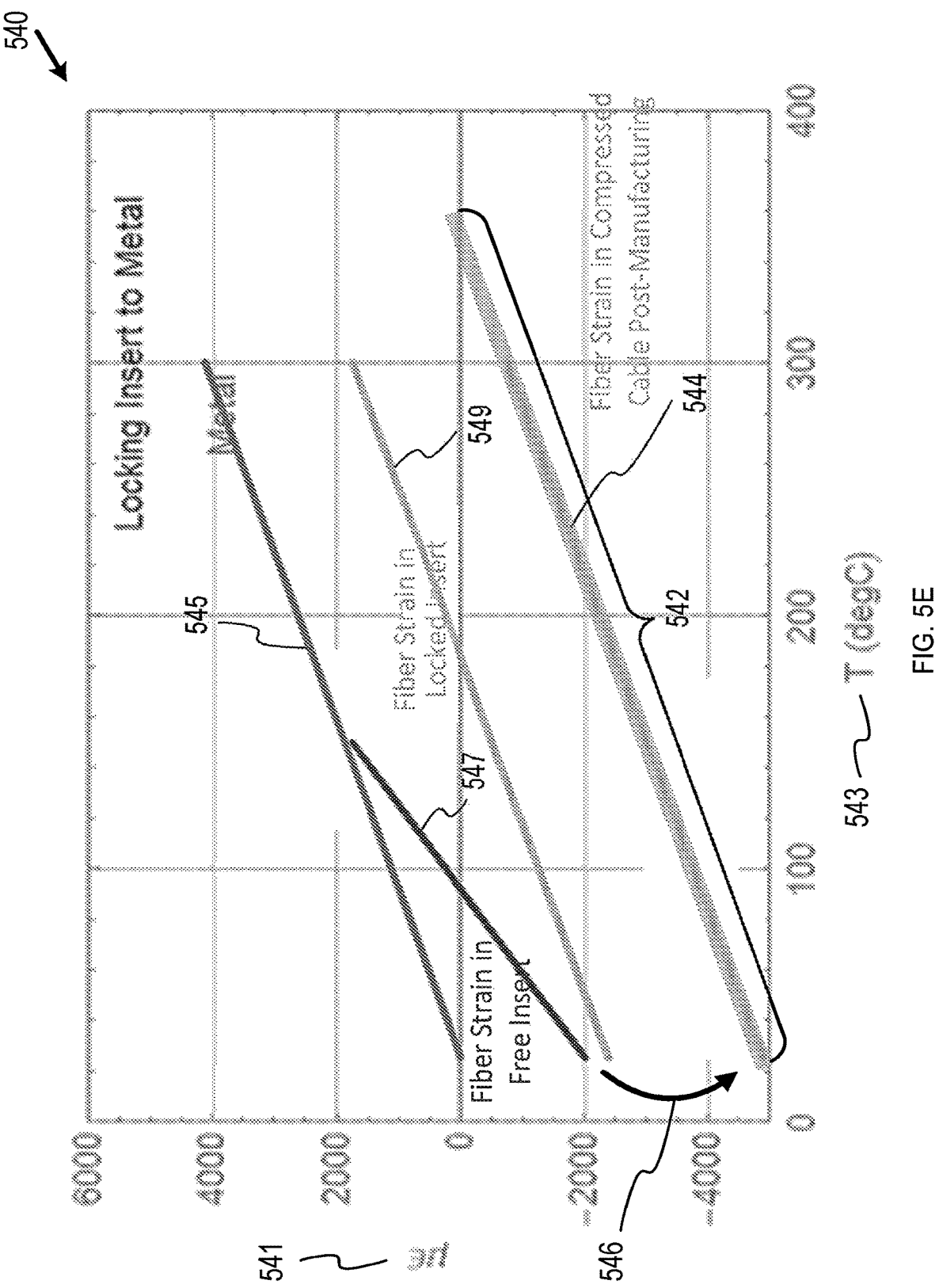
FIG. 5E is a fifth plot depicting a lock of the fiber insert and metal layer, according to some implementations.

FIG. 5E is a fifth plot depicting a lock of the fiber insert and metal layer, according to some implementations. A plot 540 may be described with reference to FIG. 1. The plot 540 depicts an X-axis 543 measuring temperature in Celsius and a Y-axis 541 measuring values of microstrain (με). A fiber strain in free insert curve 547, a metal outer thermal strain curve 545, and a fiber strain in locked insert curve 549 may be similar to the fiber strain in free insert curve 537, metal outer curve 535, and the fiber strain in locked insert curve 549 of FIG. 5D, respectively. Similar to FIG. 5D, the metal layer is locked to the fiber insert at 300° C. while the fiber is at a lower temperature. However, the locked fiber insert of FIG. 5E may undergo further processing. For example, the cable assembly as depicted by the fiber strain in locked insert curve 549 may be brought through one or more forming rollers during post-processing. The forming rollers (not depicted) may shorten the metal layer and add to the state of compression of the optical fiber. This may be similar to how extra-fiber length (EFL) is increased in standard FIMT manufacturing. The resulting cable assembly, as depicted by a fiber strain in compressed cable post-manufacturing curve 544, may result in a larger tension-free temperature range 542 than the tension-free temperature range 532 of the fiber strain in locked insert curve 539. An arrow 546 details the increase in compression of the locked fiber insert (thus, higher magnitude values of negative microstrain) after post-manufacturing from the curve 549 to the curve 544.

Figure 5F:
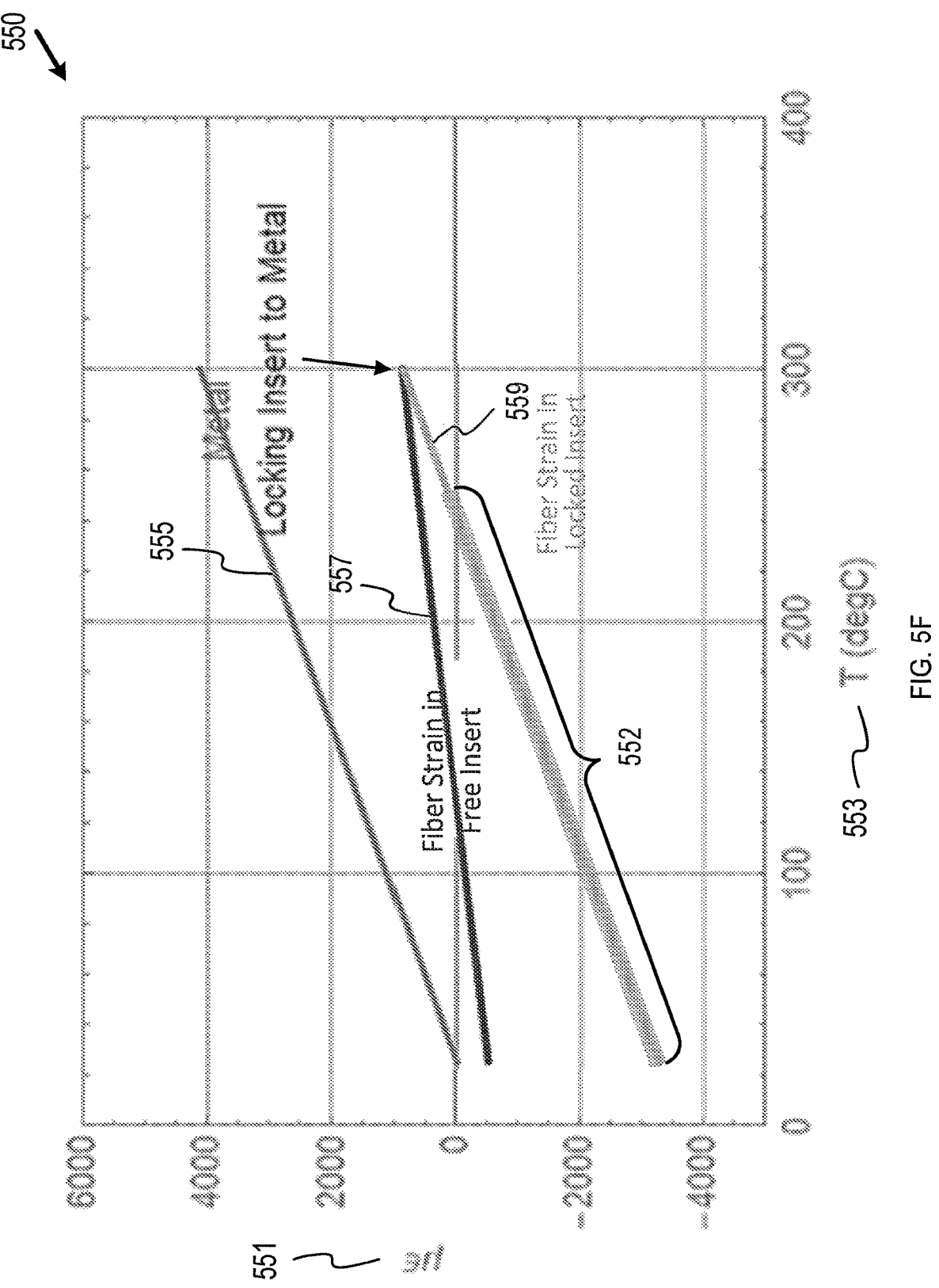
FIG. 5F is a sixth plot depicting a lock of the fiber insert and metal layer, according to some implementations.

FIG. 5F is a sixth plot depicting a lock of the fiber insert and metal layer, according to some implementations. A plot 550 may be described with reference to FIG. 1 and FIG. 5D. The plot 550 depicts an X-axis 553 measuring temperature in Celsius and a Y-axis 551 measuring values of microstrain ($\mu\varepsilon$). A fiber strain in free insert curve 557 may measure the strain in the optical fiber contained in an insert subjected as function of temperature while a metal outer curve 555 measures a thermal expansion of a metal layer. In FIG. 5F, the metal layer is locked to the fiber insert at a high temperature. For example, the metal layer may be locked to the fiber insert at 300° C. The fiber insert of the fiber strain in free insert curve 557 may comprise an especially low CTE. For example, the fiber insert may utilize a fiber-reinforced composite such as the prior mentioned graphite or carbon fibers embedded in a PPS matrix. This material comprises a CTE near 1 $\mu\varepsilon$/K. Upon cooldown, the low CTE of the fiber insert may result in compression of an optical fiber within the fiber insert (similar to the optical fiber 101) upon cooldown at room temperature. A fiber strain in locked insert curve 559 depicts this residual state of axial compression in the fiber insert after locking with the metal layer over a tension-free temperature range 552. The above plots 520, 530, 540, and 550 depict assembled cable configurations that may satisfy Equation 1.

While the examples shown herein describe a single metal armor being applied, multiple layers of metal armor may be applied to build up the cable. Likewise, the fiber insert is not limited in the number of layers or composition of the layers. Therefore, the insert may have the form of the cable 100 of FIG. 1 and be integrated as the insert, or the cable 100 may be the central element of a thicker insert, to be used in a cable having a larger metal outer layer than the metallic armor 111. In other words, the fiber insert may include thin layers of metal as part of its construction.

Figure 6:
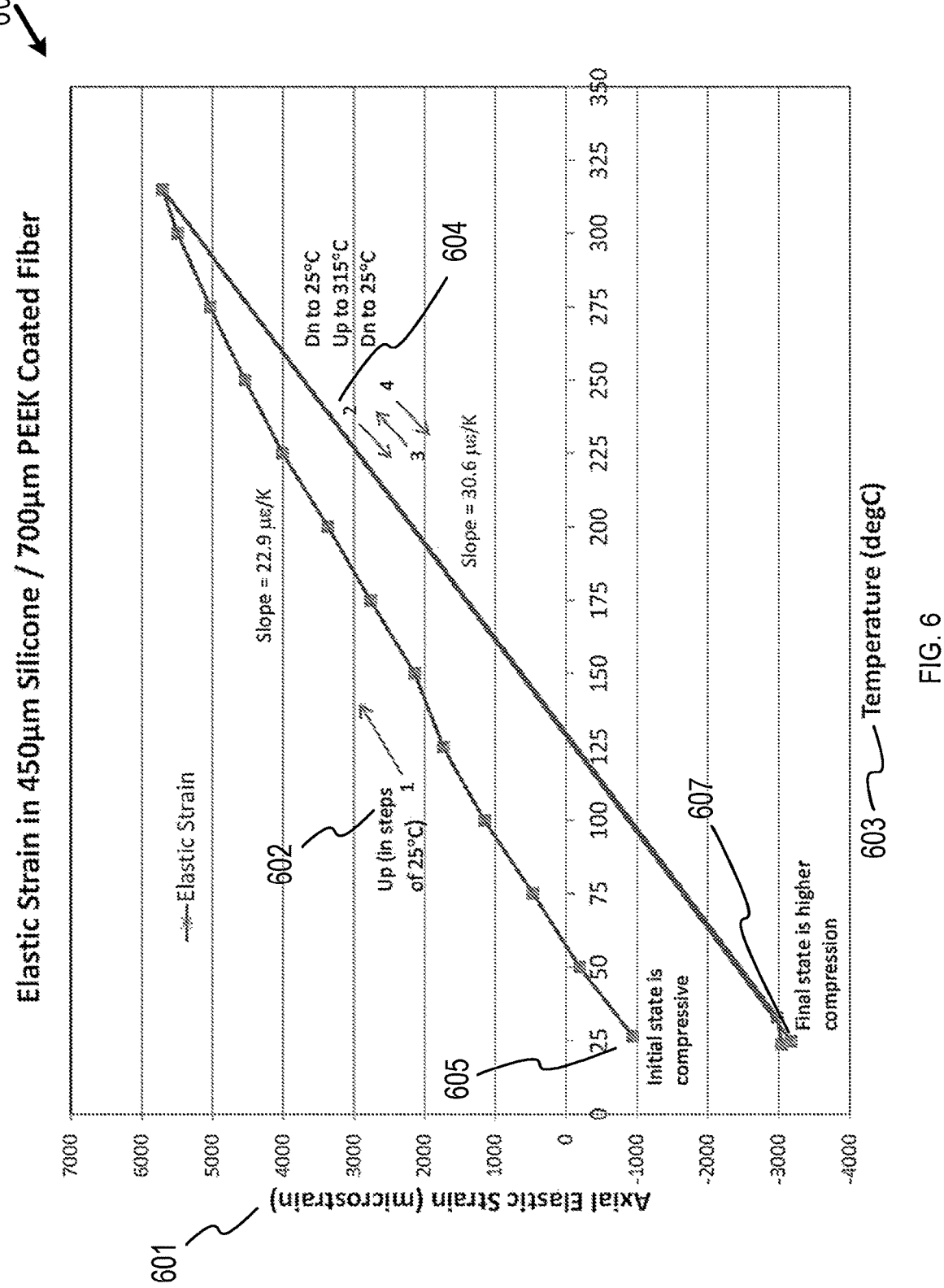
FIG. 6 is a plot depicting a processing of a PEEK-coated optical fiber to increase a compressive strain in the fiber, according to some implementations.

FIG. 6 is a plot depicting a processing of a PEEK-coated optical fiber to increase a compressive strain in the fiber, according to some implementations. The PEEK-coated optical fiber referenced in the plot 600 may be similar to the optical fiber 101 surrounded by the inner and outer PEEK layers 107, 109 of FIG. 1, respectively. The PEEK-coated optical fiber may comprise a silicone layer of 450 microns and one or more PEEK layers of a combined 700-micron thickness. The plot 600 may include an X-axis 603 depicting temperature in Celsius and a Y-axis 601 depicting an axial elastic strain in microstrain ($u\varepsilon$) units (micrometers per meter) The PEEK-coated optical fiber may have a residual compressive state of about –1,000 $\mu\varepsilon$, represented by an initial state 605 (negative strain indicates compression). Additional processing may increase the magnitude of compression to –3,000 $\mu\varepsilon$, as seen in a final state 607 of the PEEK-coated optical fiber. Processing the PEEK-coated optical fiber (i.e., fiber insert) may be completed in one or more steps prior to insertion of the PEEK-coated optical fiber into a cable. For example, step 602 details a first step in which the PEEK-coated optical fiber undergoes thermal expansion from its initial state 605 to a temperature of approximately 320° C. in increments of 25° C. At 320° C., the PEEK coating(s) may melt on to the optical fiber and other underlying coatings. In some implementations, other properties of the PEEK coatings may be altered at the elevated temperature. In some implementations, different grades of PEEK may be used, and the different grades may comprise different melting temperatures. Thus, a PEEK-coated optical fiber may utilize PEEK coatings of various grades to further increase its state of compression at room temperature, although other organic materials similar to PEEK may be used, such as ULTEM™, Ormocers, etc.

At a step 604, the PEEK-coated optical fiber is allowed to cool back to room temperature, where the one or more PEEK layers may again re-solidify at the final state 607. Step 602 and step 604 may be repeated to yield similar results (see multiple data points near the final state 607). The PEEK-coated optical fiber may yield a higher effective CTE upon cooldown, as denoted by the slope of 30.6 $\mu\varepsilon$/K when compared to an initial CTE of 22.9 $\mu\varepsilon$/K.

Upon re-solidification at room temperature, the PEEK layers may shrink and bring the optical fiber into a state of axial compression. A metallic armor may then be locked over the fiber insert to form a resulting optical fiber cable and retain the state of axial compression on the optical fiber. This may occur due to variations in CTEs: the metallic armor may comprise a lower CTE than the PEEK layers but a higher stiffness. Thus, the stiffness of the metal is large enough to drive the expansion of the resulting cable.

Example Well System

Figure 7:
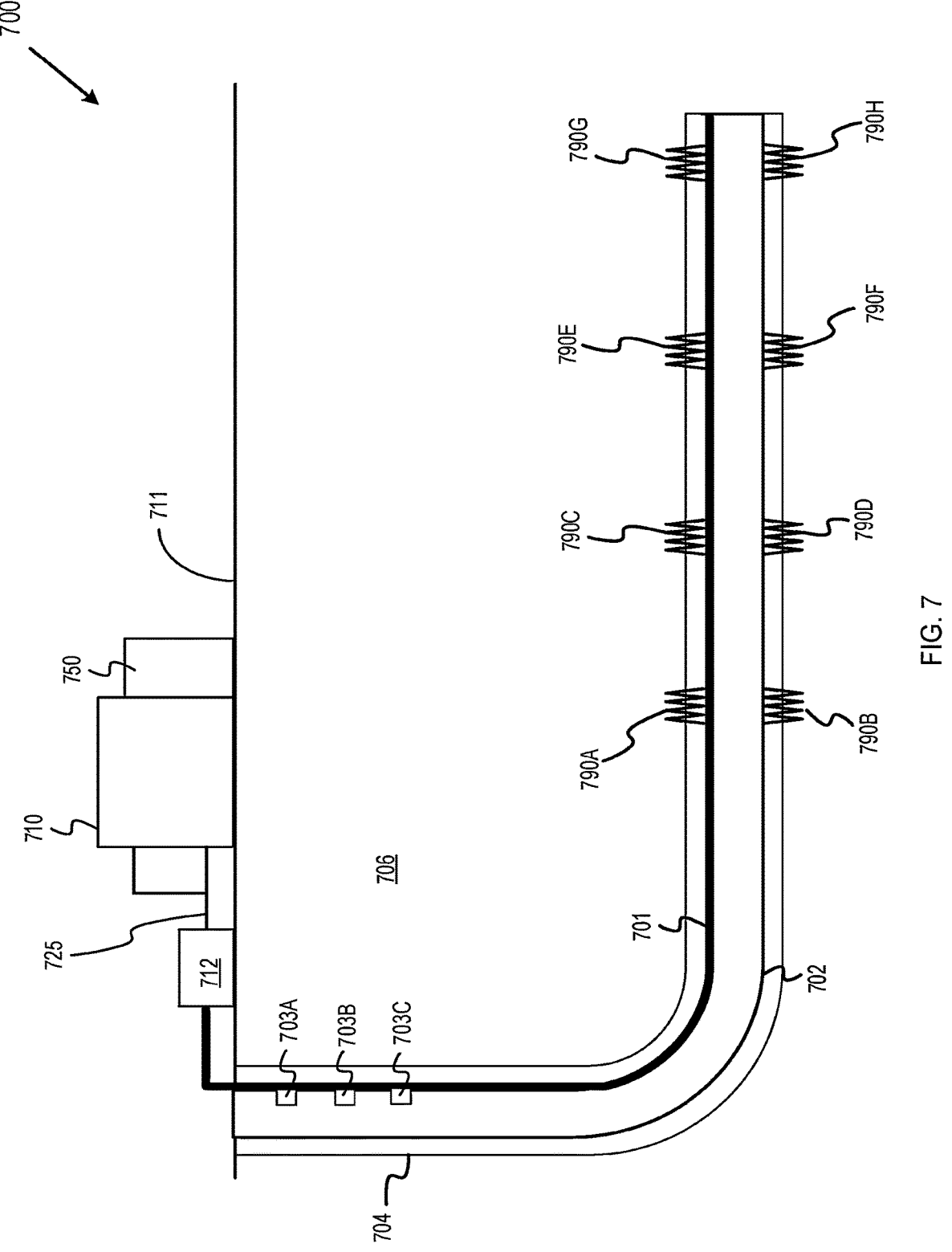
FIG. 7 is a conceptual diagram depicting an example well system, according to some implementations.

FIG. 7 is a conceptual diagram depicting an example well system, according to some implementations. A well system 700 may be described with reference to FIG. 1. The well system 700 may comprise a wellbore 704 in a subsurface formation 706. The wellbore 704 may include a casing 702 and a number of perforations 790A-790G being made in the casing 702 at different depths as part of hydraulic fracturing to allow hydraulic communication between the subsurface formation 706 and the casing 702. The well system 700 also may include a fiber optic cable 701. The fiber optic cable 701 may be similar to the optical fiber cable 100 of FIG. 1, comprising a fiber insert and a metallic armor 111. The fiber optic cable 701 may be cemented in place in the annular space between the casing 702 of the wellbore 704 and the subsurface formation 706. In some implementations, the fiber optic cable 701 may be clamped to the outside of an attachment structure such as the casing 702 or a production tubing during deployment and protected by centralizers and cross coupling clamps. The fiber optic cable 701 may house one or more optical fibers, and the optical fibers may be single mode fibers, multi-mode fibers, or a combination of single mode and multi-mode optical fibers.

The fiber optic cable 701 may be used for distributed sensing where acoustic, strain, and temperature data may be collected. The data may be collected at various positions distributed along the fiber optic cable 701. For example, data may be collected every 1-3 ft along the full length of the fiber optic cable 701. The fiber optic cable 701 may be included with coiled tubing, wireline, loose fiber using coiled tubing, or gravity deployed fiber coils that unwind the fiber as the coils are moved in the wellbore 704. The fiber optic cable 701 also may be deployed with pumped down coils and/or self-propelled containers. Additional deployment options for the fiber optic cable 701 may include coil tubing and wireline deployed coils where the fiber optic cable 701 is anchored at the toe of the wellbore 704. In such implementations, the fiber optic cable 701 may be deployed when the wireline or coiled tubing is removed from the wellbore 704. The fiber optic cable 701 may be deployed on the production tubing and clamped to the production tubing at every collar location of the production tubing in similar fashion as done for the casing. The distribution of sensors shown in FIG. 7 is for example purposes only. Any suitable sensor deployment may be used. For example, the well system 700 may include fiber optic cable deployed sensors or sensors cemented into the casing. Different types of sensors deployments also may be combined in a single well, such as including both sensors cemented to the casing and sensors in plugs, flow metering devices, etc. in a single well system.

A fiber optic interrogation unit 712 may be located on the surface 711 of the well system 700. The fiber optic interrogation unit 712 may be directly coupled to the fiber optic cable 701. Alternatively, the fiber optic interrogation unit 712 may be coupled to a fiber stretcher module, wherein the fiber stretcher module is coupled to the fiber optic cable 701. The fiber optic interrogation unit 712 may receive measurement values taken and/or transmitted along the length of the fiber optic cable 701 such as acoustic, temperature, strain, etc. The fiber optic interrogation unit 712 may be electrically connected to a digitizer to convert optically transmitted measurements into digitized measurements. The well system 700 may contain multiple sensors, such as sensors 703A-C. There may be any suitable number of sensors placed at any suitable location in the wellbore 704. The sensors 703A-C may include pressure sensors, distributed fiber optic sensors, point temperature sensors, point acoustic sensors, interferometric sensors or point strain sensors. Distributed fiber optic sensors may be capable of measuring distributed acoustic data, distributed temperature data, and distributed strain data. Any of the sensors 703A-C may be communicatively coupled (not shown) to other components of the well system 700 (e.g., the computer 710). The sensors 703A-C may be cemented to the casing 702.

A computer 710 may receive the electrically transmitted measurements from the fiber optic interrogation unit 712 using a connector 725. The computer 710 may include a signal processor 707 to perform various signal processing operations on signals captured by the fiber optic interrogation unit 712 and/or other components of the well system 700. The computer 710 may have one or more processors and a memory device to analyze the measurements and graphically represent analysis results on a display device 750.

The fiber optic interrogation unit 712 may operate using various sensing principles including but not limited to amplitude-based sensing systems like Distributed Temperature Sensing (DTS), DAS, Distributed Vibration Sensing (DVS), and Distributed Strain Sensing (DSS). For example, the DTS system may be based on Raman and/or Brillouin scattering. A DAS system may be a phase sensing-based system based on interferometric sensing using homodyne or heterodyne techniques where the system may sense phase or intensity changes due to constructive or destructive interference. The DAS system may also be based on Rayleigh scattering and, in particular, coherent Rayleigh scattering. A DSS system may be a strain sensing system using dynamic strain measurements based on interferometric sensors (e.g., sensors 703A-C) or static strain sensing measurements using Brillouin scattering. DAS systems based on Rayleigh scattering may also be used to detect dynamic strain events. Temperature effects may in some cases be subtracted from both static and/or dynamic strain events, and temperature profiles may be measured using Raman based systems and/or Brillouin based systems capable of differentiating between strain and temperature, and/or any other optical and/or electronic temperature sensors, and/or any other optical and/or electronic temperature sensors, and/or estimated thermal events.

Rayleigh based DAS systems may be combined with enhanced back scatter fibers where fibers may be engineered to provide different levels of back scattered light in order to improve DAS system performance. Enhanced back scatter fibers may be sensitive to hydrogen degradation where free hydrogen in wellbores may cause fiber darkening. As such, it may be desirable to include a barrier to prevent or delay hydrogen ingress into the optical fiber, and one such barrier may be aluminum. Enhanced back scatter fibers may have a peak wavelength or a wavelength range that may vary with fiber strain where it is desirable to ensure that the operating wavelength of the DAS system aligns with the resulting enhanced scatter fiber wavelength due to imposed strain in the final processed hydrogen tolerant fiber cable. This will result in a high-performance hydrogen tolerant cable with a long service life that may be used for dynamic strain and acoustic measurements using, e.g., interferometric Rayleigh scattering based systems and/or static strain measurements using Brillouin scattering based systems or absolute frequency shift Rayleigh scattering based systems.

In some implementations, the fiber optic cable 701 may be utilized in a multitude of operations including but not limited to wireline operations, artificial lift operations (such as being disposed proximate to an electric submersible pump (ESP)), completions operations, a drilling operation, injection and production monitoring, etc. For example, the fiber optic cable 701 may be used in cap rock monitoring. In carbon capture utilization and storage (CCUS) operations, the fiber optic cable 701 may be used to monitor a pressure or strain proximate to the cap rock to ensure the cap rock is not fractured during injection. In some implementations, movement of the subsurface formation 706 may induce a reaction at the fiber optic cable 701 and/or the sensors 703A-C, and this movement of the subsurface formation 706 may register as a detectable strain measurement.

In some implementations, the fiber optic cable 701 may be used in a multi-well system. A second wellbore may be used within a proximity of the wellbore 704, and the second wellbore may comprise one or more fractures stemming from perforations similar to the perforations 790A-790G. The second wellbore may also comprise a fiber optic cable similar to the fiber optic cable 701. Either of the fiber optic cables (i.e., the fiber optic cable 701 in the wellbore 704 and the fiber optic cable in the second wellbore) and associated sensors may be used to obtain measurements of cross-well strain between the two wellbores.

In some implementations, the fiber optic interrogation unit 712 may measure changes in optical fiber properties between two points in the optical fiber at any given point, and these two measurement points move along the optical sensing fiber as light travels along the optical fiber. Changes in optical properties may be induced by strain, vibration, acoustic signals and/or temperature as a result of the fluid flow. Phase and intensity based interferometric sensing systems may be sensitive to temperature and mechanical, as well as acoustically induced, vibrations. The fiber optic interrogation unit 712 may capture DAS data in the time domain. One or more components of the well system 700 may convert the DAS data from the time domain to frequency domain data using Fast Fourier Transforms (FFT) and other transforms. For example, wavelet transforms may also be used to generate different representations of the DAS data. Various frequency ranges may be used for different purposes and where low frequency signal changes may be attributed to formation strain changes or fluid movement and other frequency ranges may be indicative of fluid or gas movement. Various filtering techniques may be applied to generate indicators of events related to measuring the flow of fluid.

In some implementations, DAS measurements along the wellbore 704 may be used as an indication of fluid flow through the casing 702 in the wellbore 704. Vibrations and/or acoustic profiles may be recorded and stacked over time, where a simple approach could correlate total energy or recorded signal strength with known flow rates. For example, the fiber optic interrogation unit 712 may measure energy and/or amplitude in multiple frequency bands where changes in select frequency bands may be associated with oil, water and/or gas thus enabling multiphase production profiling along the wellbore 704.

In some implementations, flow metering devices (not shown) may be positioned in the wellbore 704 at different depths. The flow metering devices may include at least one fluidic oscillator. The fiber optic cable 701 may detect the signals (i.e., vibrations and/or acoustic signals) generated by the fluid as the fluid flows through the fluidic oscillators of the flow metering devices. In some implementations, the flow metering devices may be placed in an approximately horizontal section of the wellbore so different phases of the fluid flow through different fluidic oscillators within the flow metering devices. In some implementations, the flow metering devices may be positioned on surface 711. Sensors, such as the fiber optic cable 701 and electrical sensors may also be placed on surface 711 to detect the signals generated by the flow metering devices. Electrical sensors may be point devices co-located with the flow metering devices. Thus, in addition to acoustic signals, the sensors may measure pressure, differential pressure, vibration, temperature, etc. as the fluid flows through the flow metering devices at the surface.

Example Flowchart

Figure 8:
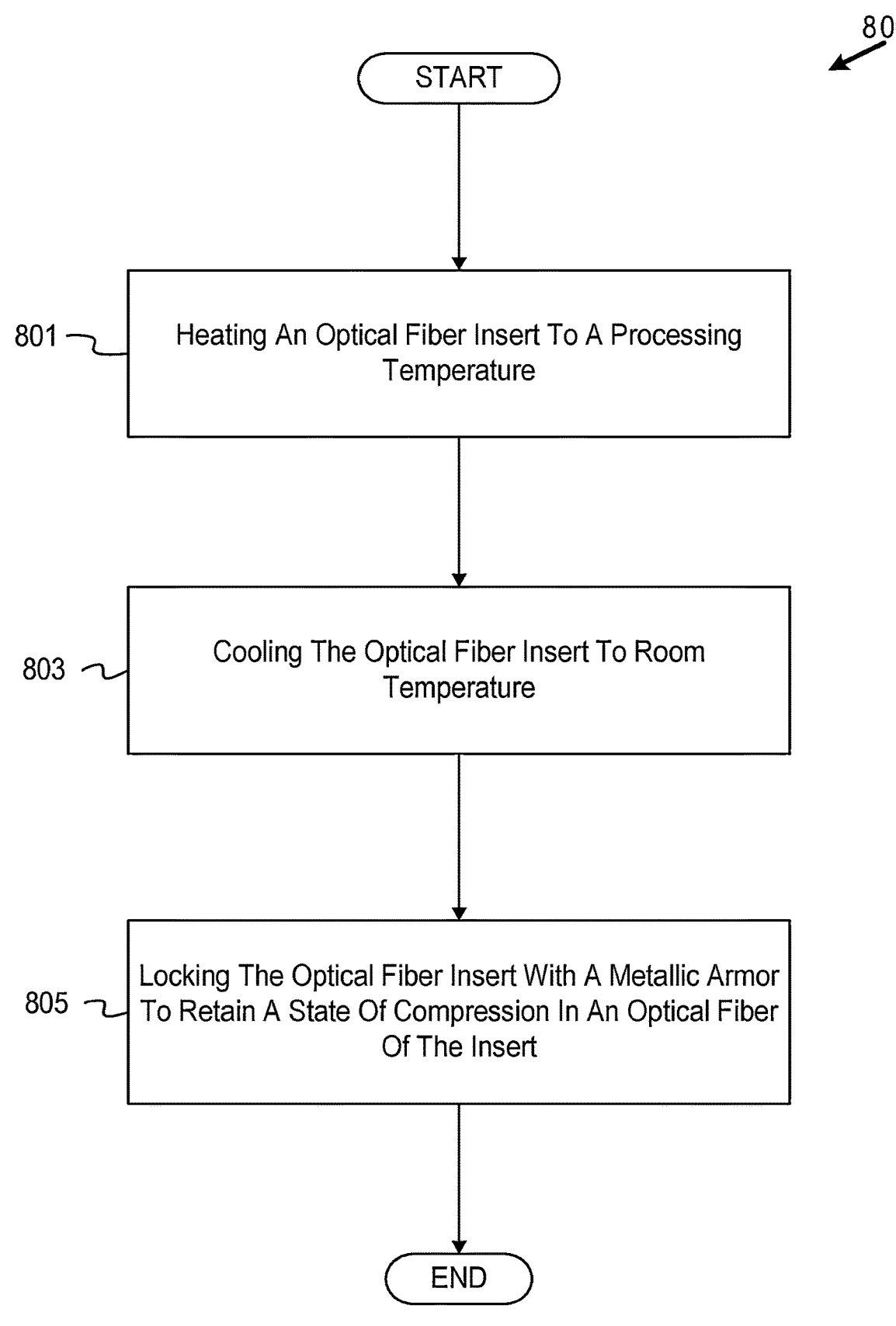
FIG. 8 is a flowchart depicting an example method for processing an optical fiber insert, according to some implementations.

FIG. 8 is a flowchart depicting an example method for processing an optical fiber insert, according to some implementations. Operations of a method 800 may be performed by software, firmware, hardware, or a combination thereof. However, such operations may be performed by other systems or components. Such operations are described with reference to FIGS. 1, 5C, and 6. The operations of the method 800 begin at block 801.

At block 801, the method 800 includes heating an optical fiber insert to a processing temperature. The optical fiber insert may comprise the optical fiber 101, acrylate coating 103, silicone coating 105, one or more PEEK layers (such as inner PEEK layer 107, and outer PEEK layer 109 of FIG. 1). However, other coatings in place of the PEEK may be possible, as described with reference to FIG. 1. With reference to FIG. 6, an optical fiber insert may be heated from an initial state 605 at room temperature to the processing temperature of ~320° C. At the processing temperature, the coating (PEEK, PEI, Ormocer, composite, etc.) may melt. Flow progresses to block 803.

At block 803, the method 800 includes cooling the optical fiber insert to room temperature. For example, the optical fiber insert may be cooled from the processing temperature to a final state 607 in accordance with step 604. At room temperature, a PEEK, PEI, Ormocer, or similar coating may re-solidify and contribute to an increased compressive strain than in the fiber insert's initial state 605. Flow progresses to block 805.

As block 805, the method 800 includes locking the optical fiber insert with a metallic armor to retain a state of compression in an optical fiber of the insert. In some implementations, the metallic armor may be similar to the metallic armor 111 of FIG. 1. At the final state 607 of FIG. 5C, the optical fiber insert may be locked within the metallic armor 111 via a compression fit, forming an optical fiber cable similar to the optical fiber cable 100. The metallic armor 111 locked around the optical fiber insert should ensure the optical fiber(s) 101 remains in a state of axial compression over a range of operating temperatures to be encountered by the fiber optic cable upon deployment. Flow of the method 800 ceases.

While the aspects of the disclosure are described with reference to various implementations and exploitations, it will be understood that these aspects are illustrative and that the scope of the claims is not limited to them. In general, techniques for generating fiber optic cables comprising optical fibers in a state of compression at room temperature as described herein may be implemented with facilities consistent with any hardware system or hardware systems. Many variations, modifications, additions, and improvements are possible.

Plural instances may be provided for components, operations or structures described herein as a single instance. Or, likewise, single instances of a component may be provided where described herein as multiple instances (for example, a single layer of PEEK instead of two or more). Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" may be infringed with only one of the listed items, multiple of the listed items, and one or more of the items in the list and another item not listed.

Example Implementations

Implementation 1: An optical fiber cable for use in a wellbore proximate to a subsurface formation, the optical fiber cable comprising: one or more optical fibers configured in a state of axial compression at room temperature, wherein the one or more optical fibers are configured to remain in the state of axial compression during a thermal expansion of the optical fiber cable in the wellbore; one or more coatings disposed around the one or more optical fibers, wherein the one or more coatings are configured to coat the one or more optical fibers; and a metallic armor disposed around the one or more optical fibers and the one or more coatings.

Implementation 2: The optical fiber cable of Implementation 1, wherein the one or more coatings are comprised of at least one of a polyetheretherketone (PEEK) coating, a polyetherimide (PEI) coating, an organically modified ceramic (Ormocer) coating, and a composite material coating.

Implementation 3: The optical fiber cable of any one or more of the Implementations 1-2, wherein the one or more optical fibers and the one or more coatings have been heated to a processing temperature.

Implementation 4: The optical fiber cable of any one or more of the Implementations 1-3, wherein the one or more optical fibers and the one or more coatings have been cooled from the processing temperature to room temperature.

Implementation 5: The optical fiber cable of any one or more of the Implementations 1-4, wherein the metallic armor has been locked around the one or more optical fibers and the one or more coatings after the one or more optical fibers and coatings have cooled to room temperature, wherein the locked metallic armor retains a compression on the one or more optical fibers.

Implementation 6: The optical fiber cable of any one or more of the Implementations 1-5, wherein the metallic armor has been heated to the processing temperature, wherein the one or more optical fibers and coatings have been heated to a lower temperature than the processing temperature, and wherein the metallic armor is disposed around the one or more optical fibers and coatings at the processing temperature.

Implementation 7: The optical fiber cable of any one or more of the Implementations 1-6, wherein the metallic armor is shortened via one or more forming rollers to increase a tension-free operating temperature range of the one or more optical fibers.

Implementation 8: The optical fiber cable of any one or more of the Implementations 1-7, wherein an axial stress of the one or more optical fibers abides by the following equation when no axial forces are applied to the optical fiber cable: $\sigma_{z,f} < E_f(\alpha - \alpha_f)^*(T_{ref} - T_{max})$, wherein $\sigma_{z,f}$ is the axial stress of the one or more optical fibers, $E_f$ is a Young's modulus of silica, $\alpha_f$ is a linear coefficient of thermal expansion (CTE) of silica, $\alpha$ is a larger value of either an effective CTE of the optical fiber cable and @structure, a CTE of a structure to which the optical fiber cable is attached to, $T_{max}$ is a temperature up to which a compression in the one or more optical fibers is maintained, and $T_{ref}$ is a reference temperature. (In the case of multiple fibers, each fiber j will have its own stress $\sigma_{z,f,j}$ satisfying Eq. (1).)

Implementation 9: An optical fiber cable system comprising an optical fiber cable for use in a wellbore proximate to a subsurface formation, the optical fiber cable system comprising: one or more optical fibers configured in a state of axial compression at room temperature, wherein the one or more optical fibers are configured to remain in the state of axial compression during a thermal expansion of the optical fiber cable in the wellbore; one or more coatings circumferentially disposed around the one or more optical fibers, wherein the one or more coatings are configured to coat the one or more optical fibers; and a metallic armor disposed around the one or more optical fibers and the one or more coatings.

Implementation 10: The optical fiber cable system of Implementation 9, wherein the one or more coatings are comprised of at least one of a polyetheretherketone (PEEK) coating, a polyetherimide (PEI) coating, an organically modified ceramic (Ormocer) coating, and a composite material coating.

Implementation 11: The optical fiber cable system of any one or more of the Implementations 9-10, wherein the one or more optical fibers and the one or more coatings have been heated to a processing temperature.

Implementation 12: The optical fiber cable system of any one or more of the Implementations 9-11, wherein the one or more optical fibers and the one or more coatings have been cooled from the processing temperature to room temperature.

Implementation 13: The optical fiber cable system of any one or more of the Implementations 9-12, wherein the metallic armor has been locked around the one or more optical fibers and the one or more coatings after the one or more optical fibers and coatings have cooled to room temperature, wherein the locked metallic armor retains a compression on the one or more optical fibers.

Implementation 14: The optical fiber cable system of any one or more of the Implementations 9-13, wherein the metallic armor has been heated to the processing temperature, wherein the one or more optical fibers and coatings have been heated to a lower temperature than the processing temperature, and wherein the metallic armor is disposed around the one or more optical fibers and coatings at the processing temperature.

Implementation 15: The optical fiber cable system of any one or more of the Implementations 9-14, wherein the metallic armor is shortened via one or more forming rollers to increase a tension-free operating temperature range of the one or more optical fibers.

Implementation 16: The optical fiber cable system of any one or more of the Implementations 9-15, wherein an axial stress of the one or more optical fibers abides by the following equation when no axial forces are applied to the optical fiber cable: $\sigma_{z,f} < E_f(\alpha - \alpha_f)^*(T_{ref} - T_{max})$, wherein $\sigma_{z,f}$ is the axial stress of the one or more optical fibers, $E_f$ is a Young's modulus of silica, $\alpha_f$ is a linear coefficient of thermal expansion (CTE) of silica, $\alpha$ is a larger value of either an effective CTE of the optical fiber cable and @structure, a CTE of a structure to which the optical fiber cable is attached to, $T_{max}$ is a temperature up to which a compression in the one or more optical fibers is maintained, and $T_{ref}$ is a reference temperature.

Implementation 17: A method for processing an optical fiber insert comprising one or more optical fibers to be used in a wellbore proximate to a subsurface formation, the method comprising: heating the optical fiber insert to a processing temperature; cooling the optical fiber insert to room temperature; and locking the optical fiber insert with a metallic armor to retain a state of compression in the one or more optical fibers.

Implementation 18: The method of Implementation 17 further comprising: locking the optical fiber insert with the metallic armor at room temperature to retain the state of compression in the one or more optical fibers.

Implementation 19: The method of any one or more of the Implementations 17-18 further comprising: heating the metallic armor to the processing temperature; heating the optical fiber insert to a temperature lower than the processing temperature; locking optical fiber insert with the metallic armor at the processing temperature, forming an assembled cable; and cooling the assembled cable to room temperature.

Implementation 20: The method of any one or more of the Implementations 17-19 further comprising: coating the optical fiber insert with one or more coatings, wherein the one or more coatings are comprised of at least one of a polyetheretherketone (PEEK) coating, a polyetherimide (PEI) coating, an organically modified ceramic (Ormocer) coating, and a composite material coating.

What is claimed is:

1. An optical fiber cable for use in a wellbore proximate to a subsurface formation, the optical fiber cable comprising:

one or more optical fibers configured in a state of axial compression at room temperature, wherein the one or more optical fibers are configured to remain in the state of axial compression during a thermal expansion of the optical fiber cable in the wellbore;

one or more coating layers comprised of a solid material and disposed around the one or more optical fibers, wherein at least one of the one or more coating layers is configured to contact a cladding of the one or more optical fibers; and a metallic armor disposed around the one or more optical fibers and the one or more coating layers.

2. The optical fiber cable of claim 1, wherein the one or more coating layers comprise at least one of a silicone coating, a polyetheretherketone (PEEK) coating, a polyetherimide (PEI) coating, an organically modified ceramic (Ormocer) coating, or a composite material coating.

3. The optical fiber cable of claim 1, wherein the one or more optical fibers and the one or more coating layers have been heated to a processing temperature.

4. The optical fiber cable of claim 3, wherein the one or more optical fibers and the one or more coating layers have been cooled from the processing temperature to room temperature.

5. The optical fiber cable of claim 4, wherein the metallic armor has been locked around the one or more optical fibers and the one or more coating layers after the one or more optical fibers and coating layers have cooled to the room temperature, wherein the locked metallic armor retains a compression on the one or more optical fibers.

6. The optical fiber cable of claim 3, wherein the metallic armor has been heated to the processing temperature, wherein the one or more optical fibers and coating layers have been heated to a lower temperature than the processing temperature, and wherein the metallic armor is disposed around the one or more optical fibers and coating layers at the processing temperature.

7. The optical fiber cable of claim 6, wherein the metallic armor is shortened via one or more forming rollers to increase a tension-free operating temperature range of the one or more optical fibers.

8. The optical fiber cable of claim 1, wherein an axial stress of the one or more optical fibers abides by the following equation when no axial forces are applied to the optical fiber cable:

$\sigma_{z,f} < E_f(\alpha - \alpha_f)*(T_{ref} - T_{max})$, wherein $\sigma_{z,f}$ is the axial stress of the one or more optical fibers, $E_f$ is a Young's modulus of silica, $\alpha_f$ is a linear coefficient of thermal expansion (CTE) of silica, $\alpha$ is a larger value of either an effective CTE of the optical fiber cable and $\alpha_{structure}$, a CTE of a structure to which the optical fiber cable is attached to, $T_{max}$ perature up to which a compression in the one or more optical fibers is maintained, and $T_{ref}$ is a reference temperature.

9. An optical fiber cable system for use in a first wellbore proximate to a subsurface formation, the optical fiber cable system comprising:

an optical fiber cable comprising, one or more optical fibers configured in a state of axial compression at room temperature, wherein the one or more optical fibers are configured to remain in the state of axial compression during a thermal expansion of the optical fiber cable in the first wellbore;

one or more coating layers comprised of a solid material and circumferentially disposed around the one or more optical fibers, wherein at least one of the one or more coating layers is configured to contact a cladding of the one or more optical fibers; and a metallic armor disposed around the one or more optical fibers and the one or more coating layers; and one or more sensors disposed in the first wellbore, wherein the one or more sensors and the optical fiber cable are configured to obtain measurements of cross-well strain between the first wellbore and a second wellbore.

10. The optical fiber cable system of claim 9, wherein the one or more coating layers comprise at least one of a silicone coating, a polyetheretherketone (PEEK) coating, a polyetherimide (PEI) coating, an organically modified ceramic (Ormocer) coating, or a composite material coating.

11. The optical fiber cable system of claim 9, wherein the one or more optical fibers and the one or more coating layers have been heated to a processing temperature.

12. The optical fiber cable system of claim 11, wherein the one or more optical fibers and the one or more coating layers have been cooled from the processing temperature to room temperature.

13. The optical fiber cable system of claim 12, wherein the metallic armor has been locked around the one or more optical fibers and the one or more coating layers after the one or more optical fibers and coating layers have cooled to room temperature, wherein the locked metallic armor retains a compression on the one or more optical fibers.

14. The optical fiber cable system of claim 11, wherein the metallic armor has been heated to the processing temperature, wherein the one or more optical fibers and coating layers have been heated to a lower temperature than the processing temperature, and wherein the metallic armor is disposed around the one or more optical fibers and coating layers at the processing temperature.

15. The optical fiber cable system of claim 14, wherein the metallic armor is shortened via one or more forming rollers to increase a tension-free operating temperature range of the one or more optical fibers.

16. The optical fiber cable system of claim 9, wherein an axial stress of the one or more optical fibers abides by the following equation when no axial forces are applied to the optical fiber cable:

$\sigma_{z,f} < E_f(\alpha - \alpha_f)*(T_{ref} - T_{max})$, wherein $\sigma_{z,f}$ is the axial stress of the one or more optical fibers, $E_f$ is a Young's modulus of silica, $\alpha_f$ is a linear coefficient of thermal expansion (CTE) of silica, $\alpha$ is a larger value of either an effective CTE of the optical fiber cable and $\alpha_{structure}$, a CTE of a structure to which the optical fiber cable is attached to, $T_{max}$ perature up to which a compression in the one or more optical fibers is maintained, and $T_{ref}$ is a reference temperature.

17. A method for processing an optical fiber insert comprising one or more optical fibers to be used in a wellbore proximate to a subsurface formation, the method comprising:

heating the optical fiber insert to a processing temperature;

cooling the optical fiber insert to room temperature; and locking the optical fiber insert with a metallic armor to retain a state of compression in the one or more optical fibers.

18. The method of claim 17 further comprising:

locking the optical fiber insert with the metallic armor at room temperature to retain the state of compression in the one or more optical fibers.

19. The method of claim 17 further comprising:

heating the metallic armor to the processing temperature;

heating the optical fiber insert to a temperature lower than the processing temperature;

locking optical fiber insert with the metallic armor at the processing temperature, forming an assembled cable; and cooling the assembled cable to room temperature.

20. The method of claim 17 further comprising:

coating the optical fiber insert with one or more coatings, wherein the one or more coatings are comprised of at least one of a polyetheretherketone (PEEK) coating, a polyetherimide (PEI) coating, an organically modified ceramic (Ormocer) coating, and a composite material coating.

\* \* \* \* \*